US011181197B2

(12) United States Patent
Chikamatsu et al.

(10) Patent No.: US 11,181,197 B2
(45) Date of Patent: Nov. 23, 2021

(54) WATERPROOF CONNECTOR AND DEVICE WITH CONNECTOR

(71) Applicant: Yazaki Corporation, Tokyo (JP)

(72) Inventors: Yasukazu Chikamatsu, Kakegawa (JP); Satoki Masuda, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 145 days.

(21) Appl. No.: 16/733,533

(22) Filed: Jan. 3, 2020

(65) Prior Publication Data
US 2020/0224767 A1 Jul. 16, 2020

(30) Foreign Application Priority Data

Jan. 10, 2019 (JP) .............................. JP2019-002408

(51) Int. Cl.
*F16J 15/3232* (2016.01)
*H02G 3/22* (2006.01)

(52) U.S. Cl.
CPC ............ *F16J 15/3232* (2013.01); *H02G 3/22* (2013.01)

(58) Field of Classification Search
CPC .... F16J 15/00; F16J 15/02; F16J 15/46; F16J 15/48; F16J 15/025; F16J 15/3204; F16J 15/3232; F16J 15/3236; H02G 3/00; H02G 3/22
USPC ....................................................... 277/562
See application file for complete search history.

(56) References Cited

U.S. PATENT DOCUMENTS

| 5,752,852 A * | 5/1998 | Onoda ............... H01R 13/5202 439/559 |
| 6,955,567 B2 * | 10/2005 | Inaba .................. H01R 13/113 439/651 |
| 7,048,580 B2 * | 5/2006 | Kobayashi ......... H01R 13/5221 439/587 |
| 9,343,941 B2 * | 5/2016 | Okamoto ............... H02K 11/33 |
| 2018/0366883 A1 | 12/2018 | Mori |
| 2020/0072355 A1 | 3/2020 | Crudu et al. |

FOREIGN PATENT DOCUMENTS

| CN | 109088212 A | 12/2018 |
| EP | 0644621 A2 | 3/1995 |
| EP | 2 882 045 A1 | 6/2015 |
| JP | 57-25470 U | 2/1982 |
| JP | 09-147963 A | 6/1997 |

(Continued)

*Primary Examiner* — Nathan Cumar
(74) *Attorney, Agent, or Firm* — Sughrue Mion, PLLC

(57) ABSTRACT

A seal member for waterproofing in the waterproof connector includes: a cylindrical inner tube portion that is face-to-face attached to an outer peripheral surface of a connector main body that is attached to a through-hole provided with a tapered opening; and an outer tube portion surrounding the inner tube portion in a circumferential direction at a rear side of an insertion direction into the tapered opening and opening in a larger diameter than the inner tube portion, and integrated with the inner tube portion at a front side in the insertion direction, and when the seal member is received between the outer peripheral surface of the connector main body and an inner peripheral surface of the tapered opening, face-to-face attached to the inner peripheral surface of the tapered opening while being pressed toward the inner tube portion.

9 Claims, 8 Drawing Sheets

(56) References Cited

FOREIGN PATENT DOCUMENTS

| JP | 2011-108485 | A | 6/2011 |
| WO | 2011008898 | A2 | 1/2011 |
| WO | 2018210653 | A1 | 11/2018 |

* cited by examiner

WATERPROOF CONNECTOR AND DEVICE WITH CONNECTOR

TECHNICAL FIELD

The present invention relates to a waterproof connector that is attached to a through-hole provided in an outer wall of a device and is waterproofed, and a device with a connector.

BACKGROUND ART

Conventionally, a device direct attachment type connector that is attached to a through-hole provided in an outer wall of a device is known. Such a connector is attached by inserting a part thereof into the through-hole. In such a configuration, there is a concern that water may enter between the connector and the inner periphery of the through-hole, and some waterproofing measures are often taken.

Here, some through-holes for attaching a connector in a device have a tapered opening in which an opening on the outside of the device is opened to a diameter larger than that on the inside of the device and is reduced toward the inside of the device. Such a tapered opening serves as an insertion guide when the connector is inserted into the through-hole, leading to an improvement in workability for connector mounting. On the other hand, from the viewpoint of waterproofing, care must be taken because the gap between the outer peripheral surface of the connector and the inner peripheral surface of the tapered opening tends to be large.

Then, paying attention between the outer peripheral surface of the connector and the inner peripheral surface of the tapered opening, there has been proposed a waterproof connector provided with an O-ring for sealing that is disposed at the location and seals therebetween (for example, refer to Patent Literature 1). According to the waterproof connector described in Patent Literature 1, waterproofing can be achieved by attaching the waterproof connector to the through-hole so that the O-ring is positioned between the outer peripheral surface of the connector and the inner peripheral surface of the tapered opening.

PRIOR ART DOCUMENT

Patent Literature

Patent Literature 1: JP H09-147963 A

SUMMARY OF INVENTION

Technical Problem

However, depending on the sizes of the device and the waterproof connector, the size of the tapered opening may be reduced, which may make it difficult to design and manufacture an O-ring that adheres to both the outer peripheral surface of the waterproof connector and the inner peripheral surface of the tapered opening. In addition, the O-ring, which has a generally circular cross section in the radial direction, rolls and moves on the outer peripheral surface when the waterproof connector is inserted into the through-hole and attached, and in some cases, it is difficult to perform alignment to be closely attached to the inner peripheral surface of the tapered opening.

Therefore, the present invention pays attention to the above problems, and an object of the present invention is to provide a waterproof connector and a device with a connector provided with a waterproof structure that is easy to design and manufacture and is easy to align with the tapered opening of the through-hole.

Solution to Problem

In order to solve the above problem, according to the present invention, there is provided a waterproof connector comprising:

a connector main body attached to a device such that a part of the connector main body is inserted into a through-hole that penetrates an outer wall of the device, and an opening on an outside of the device has a larger diameter than an inside of the device and becomes a tapered opening that is reduced in diameter toward the inside of the device; and a ring-shaped and flexible seal member that seals between an outer peripheral surface of the connector main body and an inner peripheral surface of the tapered opening to waterproof the through-hole, wherein the seal member includes:

a cylindrical inner tube portion that is face-to-face attached to the outer peripheral surface of the connector main body; and an outer tube portion that surrounds the inner tube portion in a circumferential direction at a rear side of an insertion direction into the tapered opening, opens in a larger diameter than the inner tube portion, and is integrated with the inner tube portion at a front side in the insertion direction, and when the seal member is received between the outer peripheral surface of the connector main body and an inner peripheral surface of the tapered opening, face-to-face attached to the inner peripheral surface of the tapered opening while being pressed toward the inner tube portion.

Further, in order to solve the above problem, according to the present invention, there is provided a device with a connector comprising:

the device provided with a through-hole penetrating an outer wall of the device, and in which an opening portion on an outside of the outer wall has a larger diameter than an opening portion on an inside of the outer wall and becomes a tapered opening that is reduced in diameter toward the inside; and a waterproof connector as claimed in any one of claims 1 to 8, a part of which is inserted into and attached to the through-hole to waterproof the through-hole.

Effect of the Invention

In the waterproof connector and the device with the connector according to the present invention, the seal member is waterproofed by the inner tube portion being face-to-face attached to the outer peripheral surface of the connector main body and the outer tube portion being face-to-face attached to the inner peripheral surface of the tapered opening. Thus, according to the waterproof connector and the device with the connector of the present invention, the contact areas of the seal member on both the connector main body side and the tapered opening side are larger than for example, an O-ring that has a substantially circular radial cross section and tends to have a small contact area with other parts. For this reason, the slight displacement of the seal member can be absorbed by the large contact area as described above, and accordingly, the seal member can be easily designed and manufactured. In addition, since the seal member is face-to-face attached to the outer peripheral surface of the connector main body and the inner peripheral surface of the tapered opening, when the waterproof connector is inserted into the through-hole and attached, the concern that the seal member rolls and moves, such as an O-ring, is eliminated. In addition, as described above, a slight displacement of the seal member can be absorbed, and accordingly, the seal member can be easily aligned with the tapered opening. In this way, in the waterproof connector and the device with the connector of the present invention, the seal member as the waterproof structure is easy to design and manufacture, and the positioning of the through-hole with respect to the tapered opening is also easy.

DESCRIPTION OF EMBODIMENTS

Hereinafter, embodiments of the present invention will be described. First, a first embodiment will be described.

Figure 1:
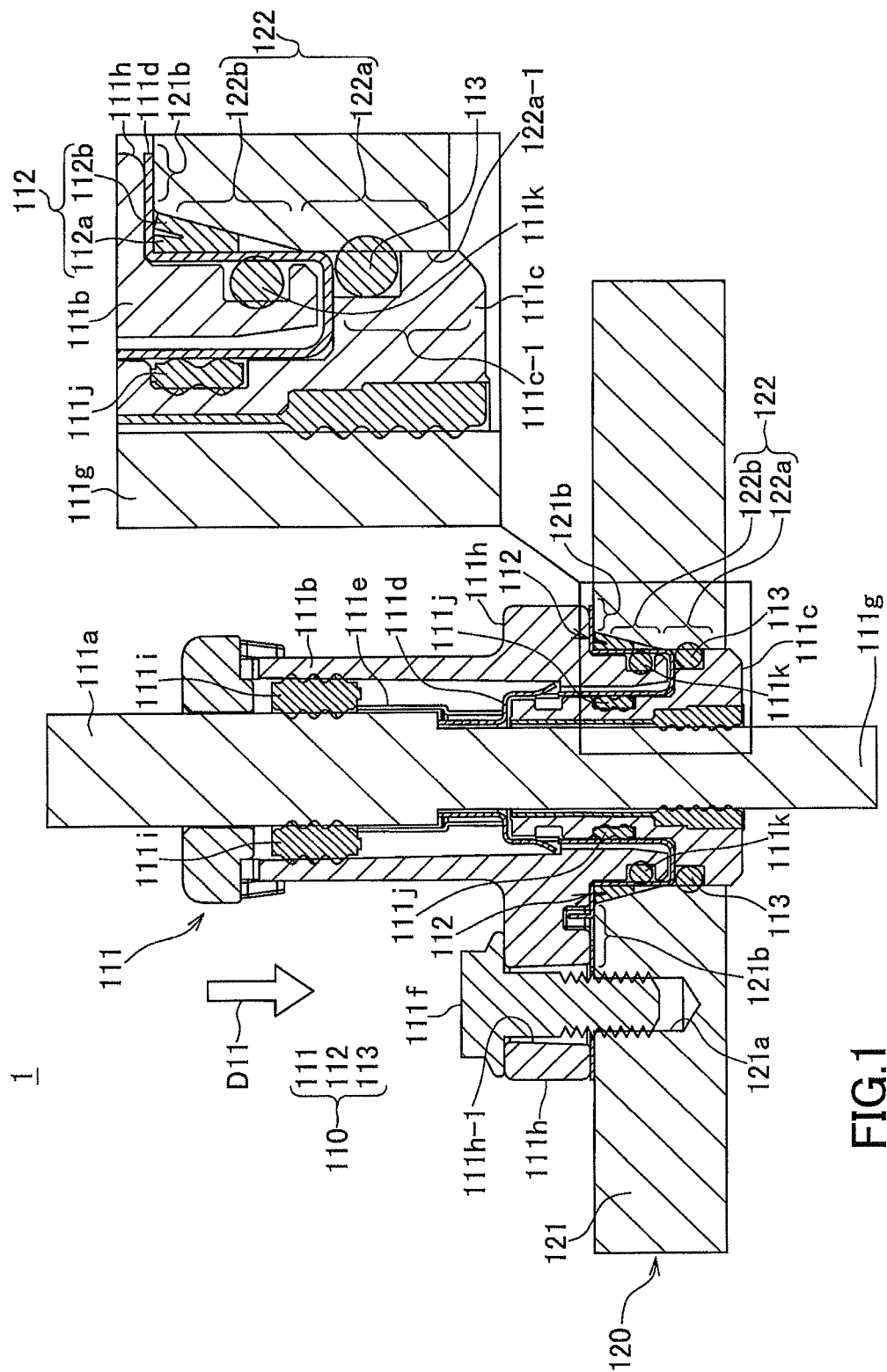
FIG. 1 is a schematic view showing a device with a connector according to a first embodiment of the present invention.

FIG. 1 is a schematic view showing a device with a connector according to the first embodiment of the present invention. In FIG. 1, the device with the connector 1 is shown in a schematic cross-sectional view of a waterproof connector 110 and an outer wall 121 in the vicinity of an attachment location of the waterproof connector 110 in a device 120.

In the device 120, a through-hole 122 as an attachment location of the waterproof connector 110 is provided on the outer wall 121. The through-hole 122 is provided with a tapered opening 122b as an opening at the end of the cylindrical-hole-shaped hole main body 122a outside of the device. The tapered opening 122b is a mortar-shaped opening that has a larger diameter than the inside of the device and is reduced in diameter toward the inside of the device.

The waterproof connector 110 is partly inserted into and attached to the through-hole 122 of the device 120 in an insertion direction D11 in the drawing, and the waterproof to the through-hole 122 is achieved. The waterproof connector 110 includes a connector main body 111, a seal member 112, and a second seal member 113.

First, the connector main body 111 will be described.

The connector main body 111 is attached to the through-hole 122 of the device 120 by being partially inserted in the insertion direction D11 in the drawing. The connector main body 111 includes a terminal portion 111a, a housing 111b, a front holder 111c, a shield shell 111d, a sleeve 111e, and a fixing bolt 111f.

The terminal portion 111a is a columnar metal terminal coupled to an end portion of the shielded electric wire 111g extending from a component inside the device 120, and a side opposite to the coupling side protrudes toward the outside of the device.

Both the housing 111b and the front holder 111c are made of resin and are formed in a substantially cylindrical shape. The housing 111b is disposed outside the device and holds the terminal portion 111a, and the front holder 111c is disposed inside the device and holds the shielded electric wire 111g. The housing 111b is provided with a flange portion 111h protruding from the outer peripheral surface of the housing 111b so as to face a peripheral surface 121b of the tapered opening 122b on the outer surface of the outer wall 121 of the device 120. Further, a cylindrical first internal seal member 111i made of flexible resin such as rubber is provided between the inner peripheral surface of the housing 111b and the outer peripheral surface of the terminal portion 111a.

The shield shell 111d is a metal cylinder member, and covers the portion from the coupling portion between the terminal portion 111a and the shielded electric wire 111g to the portion of the front holder 111c that enters the housing 111b and encloses the shielded electric wire 111g. Further, the end portion on the front holder 111c side of the shield shell 111d is folded back toward the outside of the device through an opening inside the device of the housing 111b. After the folding, the shield shell 111d covers the outer peripheral surface of the housing 111b, and extends so as to overlap with the device side surface of the flange portion 111h. A cylindrical second inner seal member 111j made of flexible resin such as rubber is provided between the inner peripheral surface of the shield shell 111d and the outer peripheral surface of the front holder 111c. Further, an annular third inner seal member 111k made of flexible resin such as rubber is provided between the inner peripheral surface of the shield shell 111d after being folded and the outer peripheral surface of the housing 111b.

The sleeve 111e is also a metal cylinder member, and covers the coupling portion between the terminal portion 111a and the shielded electric wire 111g from the outer peripheral surface side of the shield shell 111d. The sleeve 111e and the shield shell 111d are caulked at this coupling portion between the terminal portion 111a and the shielded electric wire 111g.

The fixing bolt 111f is a member for fixing the connector main body 111, that is, the waterproof connector 110 of the present embodiment to the outer wall 121 of the device 120. In the present embodiment, a through-hole 111h-1 for the fixing bolt 111f is provided in the flange portion 111h of the housing 111b of the connector main body 111. Further, the outer wall 121 of the device 120 is provided with a screw hole 121a into which the fixing bolt 111f is screwed. The fixing bolt 111f passes through the through-hole 111h-1 of the flange portion 111h and is screwed into the screw hole 121a of the outer wall 121, whereby the connector main body 111 is fastened and fixed to the outer wall 121 of the device 120.

The connector main body 111 described above is inserted and attached to the through-hole 122 provided in the outer wall 121 of the device 120 so that the end portion of the front holder 111c slightly protrudes toward the inside of the device in the insertion direction D11. The waterproofing between the connector main body 111 and the through-hole 122 is achieved by the seal member 112 and the second seal member 113.

Figure 2:
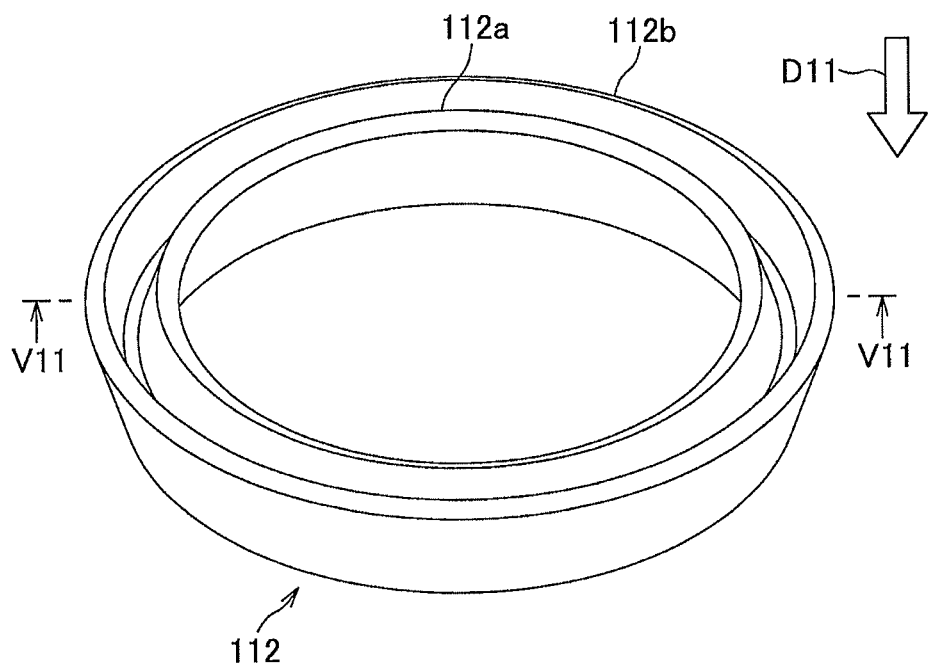
FIG. 2 is an external perspective view of a seal member shown in FIG. 1.
Figure 3:
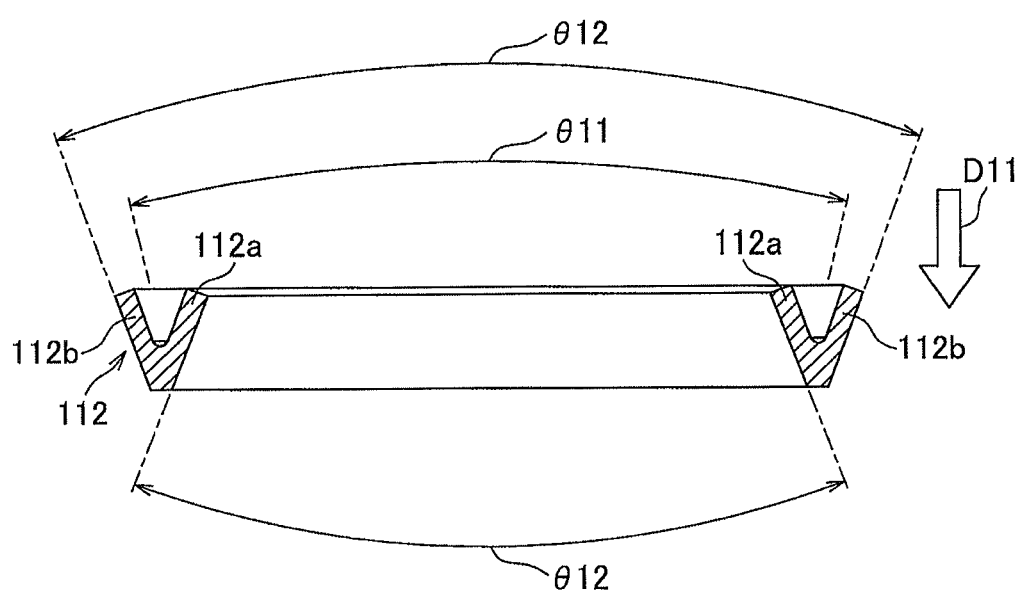
FIG. 3 is a cross-sectional view showing a radial cross section of the seal member taken along the line V11-V11 in FIG. 2.

FIG. 2 is an external perspective view of the sealing member shown in FIG. 1, and FIG. 3 shows a radial cross section of the sealing member shown in FIG. 2 taken along the line V11-V11 in FIG. 2.

As shown in FIG. 1, the seal member 112 seals between the outer peripheral surface of the connector main body 111, specifically, the outer peripheral surface of the folded portion of the shield shell 111d and the inner peripheral surface of the tapered opening 122b for waterproofing the through-hole 122. The seal member 112 is formed in a ring shape with flexible oil-impregnated silicone rubber.

As shown in FIGS. 1 to 3, the seal member 112 has a double cylinder structure having an inner tube portion 112a and an outer tube portion 112b.

The inner tube portion 112a is a cylindrical portion that is face-to-face attached to the outer peripheral surface of the connector main body 111. The outer tube portion 112b surrounds the inner tube portion 112a in the circumferential direction on the rear side in the insertion direction D11 with respect to the tapered opening 122b and opens larger in diameter than the inner tube portion 112a, and is integrated with the inner tube portion 112a on the front side in the insertion direction D11. Further, when the seal member 112 is received between the outer peripheral surface of the connector main body 111 and the inner peripheral surface of the tapered opening 122b, the outer tube portion 112b is face-to-face attached to the inner peripheral surface of the tapered opening 112b while being pressed toward the inner tube portion 112a.

More specifically, in the present embodiment, the outer tube portion 112b has a tapered cylindrical shape extending while being reduced in diameter in the insertion direction D11 at a taper angle θ12 larger than the taper angle θ11 of the tapered opening 122b. Further, the inner tube portion 112a has a reverse tapered cylindrical shape whose diameter is reduced in the opposite direction to the insertion direction D11 by the same taper angle θ12 as the taper angle θ12 of the outer tube portion 112b. As a result, as shown in FIG. 3, the inner tube portion 112a and the outer tube portion 112b of the sealing member 112 form a substantially V-shape in the radial cross section before being accommodated between the outer peripheral surface of the connector main body 111 and the inner peripheral surface of the tapered opening 122b. When the seal member 112 is received between the outer peripheral surface of the connector main body 111 and the inner peripheral surface of the tapered opening 122b, the seal member 112 is closed so that the outer tube portion 112b and the inner tube portion 112a are close to each other.

Along with the seal member 112 described above, a second seal member 113 shown in FIG. 1 is attached to the connector main body 111.

The second seal member 113 is disposed between the front outer peripheral surface 111c-1 of the front holder 111c and the inner peripheral surface 122a-1 of the hole main body 122a in the through-hole 122, and seals therebetween. The front outer peripheral surface 111c-1 of the front holder 111c is an outer peripheral surface located on the front side in the insertion direction D11 with respect to the tapered opening 122b in the connector main body 111. In the present embodiment, the front outer peripheral surface 111c-1 of the front holder 111c is provided with a recessed portion that is recessed to accommodate the second seal member 113. Further, the inner peripheral surface 122a-1 of the hole main body 122a is a front inner peripheral surface that is located on the front side in the insertion direction D11 with respect to the tapered opening 122b in the through-hole 122. The second seal member 113 is a ring-shaped and flexible seal member having a circular cross section in the radial direction. The second seal member 113 is sandwiched between the bottom of the recess on the front outer peripheral surface 111c-1 and the inner peripheral surface 122a-1 of the hole main body 122a, and is pressed and crushed by the both to seal therebetween.

In the waterproof connector 110 and the device with the connector 1 according to first embodiment described above, the seal member 112 is waterproofed by the inner tube portion 112a being face-to-face attached to the outer peripheral surface of the connector main body 111 and the outer tube portion 112b being face-to-face attached to the inner peripheral surface of the tapered opening 122b. In this way, according to the present embodiment, the contact areas of the seal member 112 on both the connector main body 111 side and the tapered opening 122b side are larger than for example, an O-ring that has a substantially circular radial cross section and tends to have a small contact area with other parts. For this reason, the slight displacement of the seal member 112 can be absorbed by the large contact area as described above, and accordingly, the seal member 112 can be easily designed and manufactured. In addition, since the seal member 112 is face-to-face attached to the outer peripheral surface of the connector main body 111 and the inner peripheral surface of the tapered opening 122b, when the waterproof connector 110 is inserted into the through-hole 122 and attached, the concern that the seal member 112 rolls and moves, such as an O-ring, is eliminated. In addition, as described above, a slight displacement of the seal member 112 can be absorbed, and accordingly, the seal member 112 can be easily aligned with the tapered opening 122b. In this way, according to the present embodiment, the seal member 112 as the waterproof structure is easy to design and manufacture, and the positioning of the through-hole 122 with respect to the tapered opening 122b is also easy.

Here, in the present embodiment, the connector main body 111 includes a flange portion 111h projecting from the outer peripheral surface 111b so as to face a peripheral surface 121b of the tapered opening 122b on an outer surface of the outer wall 121 of the device 120.

Thereby, since the protrusion of the sealing member 112 to outside of the device from the tapered opening 122b can be suppressed by fastening the sealing member 112 with the flange portion 111h, a waterproof effect can be stabilized.

Further, in the present embodiment, the outer tube portion 112b has a tapered cylindrical shape extending while being reduced in diameter in the insertion direction D11 at the taper angle θ12 larger than the taper angle θ11 of the tapered opening 122b.

According to the present embodiment, since the contact pressure of the outer tube portion 112b with respect to the inner peripheral surface of the tapered opening 122b can be increased, the higher waterproof effect can be acquired.

Further, in this embodiment, the inner tube portion 112a of the seal member 112 has a reverse tapered cylindrical shape whose diameter is reduced in a direction opposite to the insertion direction D11, as shown in FIGS. 2 and 3.

In the seal member 112 in which the inner tube portion 112a has a reverse tapered cylindrical shape, the inner tube portion 112a is pressed toward the outer tube portion 112b by the outer peripheral surface of the connector main body 111. Thereby, since the contact pressure of the inner tube portion 112a with respect to the outer peripheral surface of the connector main body 111 can be increased, the higher waterproof effect can be acquired.

Further, in the present embodiment, the second seal member 113 is disposed between the front outer peripheral surface 111c-1 of the front holder 111c and the inner peripheral surface 122a-1 of the hole main body 122a in the through-hole 122, and seals therebetween.

According to the present embodiment, the second seal member 113 can also provide waterproofing between the connector main body 111 and a portion of the through-hole 122 on the back side of the tapered opening 122b.

Next, a second embodiment will be described. In the second embodiment, the shape of the inner tube portion of the seal member is different from that of the first embodiment. On the other hand, the connector main body and the device are the same as those in the first embodiment. Hereinafter, the second embodiment will be described by paying attention to differences from the first embodiment, and illustrations and descriptions of the same points as the first embodiment such as the connector main body and the device will be omitted.

Figure 4:
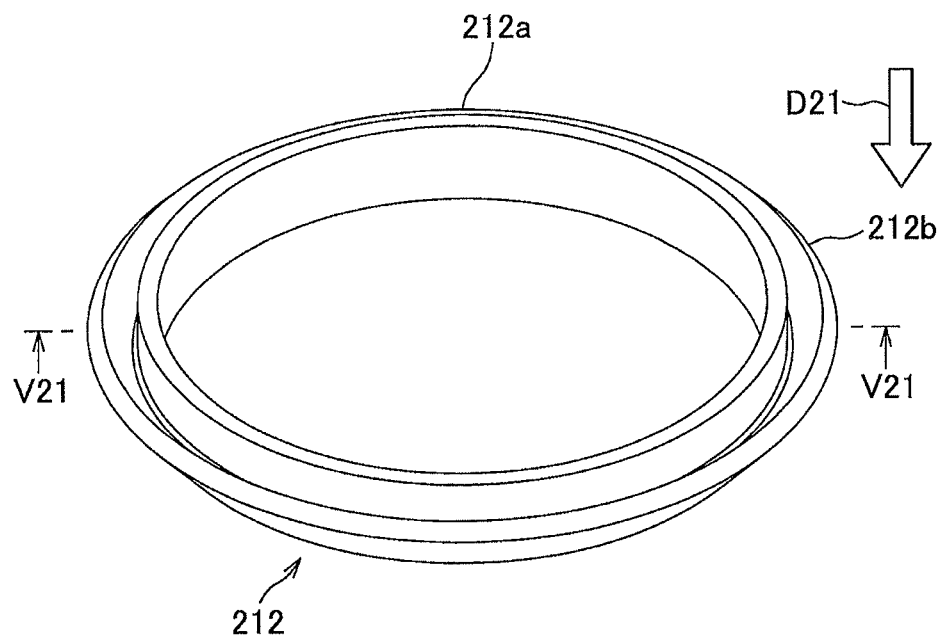
FIG. 4 is an external perspective view of a seal member according to a second embodiment of the present invention.
Figure 5:
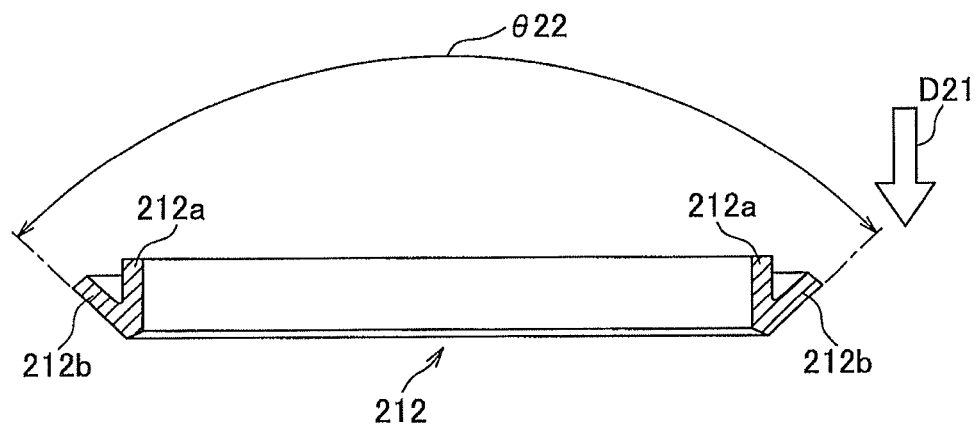
FIG. 5 is a cross-sectional view showing a radial cross section of the seal member taken along the line V21-V21 in FIG. 4.

FIG. 4 is an external perspective view of a seal member according to a second embodiment of the present invention, and FIG. 5 is a cross-sectional view showing a radial cross section of the seal member taken along the line V21-V21 in FIG. 4.

As shown in FIGS. 5 and 4, the seal member 212 of the present embodiment is different from the first embodiment in that the inner tube portion 212a integrated with the outer tube portion 212b has a straight cylindrical shape that has the same diameter from one end to the other end in the insertion direction D21. Further, the taper angle θ22 of the outer tube portion 212b is larger than the taper angle θ12 of the outer tube portion 112b in the first embodiment described above. The inner tube portion 212a and the outer tube portion 212b are integrated with each other on the front side in the insertion direction D21. As shown in FIG. 5, in the radial cross section of the seal member 212, the inner tube portion 112a and the outer tube portion 112b form a substantially V shape that is inclined radially outward.

Needless to say, in the second embodiment described above, like the first embodiment described above, the seal member 212 as a waterproof structure is easy to design and manufacture, and the alignment with the through-hole 122 of the tapered opening 122b is also easy.

Further, according to the present embodiment, the force received by the straight cylindrical inner tube portion 112a when the seal member 112 is attached to the connector main body 111 (FIG. 1) is substantially constant in the axial direction. Therefore, the attachment property of the seal member 112 to the connector main body 111 can be improved.

Next, a third embodiment will be described. In the third embodiment, the shape of the seal member is totally different from that of the first embodiment described above. On the other hand, the connector main body and the device are the same as those in the first embodiment. In the following, the third embodiment will be described by paying attention to differences from the first embodiment, and illustrations and descriptions of the same points as the first embodiment such as the connector main body and the device will be omitted.

Figure 6:
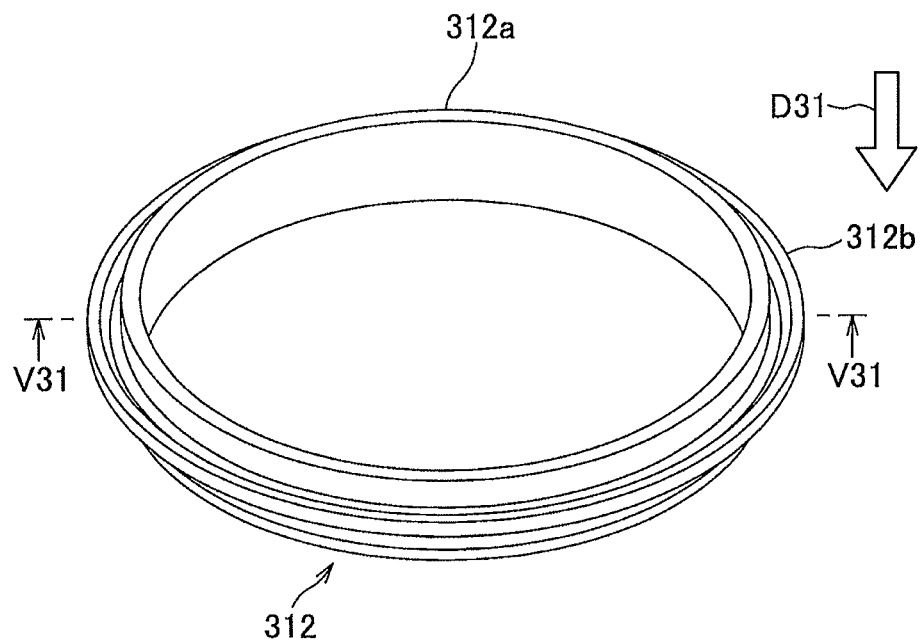
FIG. 6 is an external perspective view of a seal member according to a third embodiment of the present invention.
Figure 7:
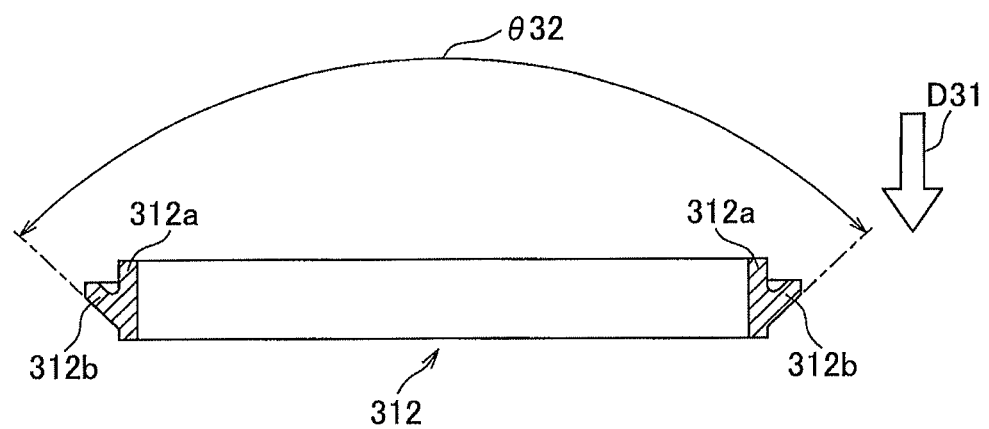
FIG. 7 is a cross-sectional view showing a radial cross section of the sealing member taken along line V31-V31 in FIG. 6.

FIG. 6 is an external perspective view of a seal member according to a third embodiment of the present invention, and FIG. 7 is a cross-sectional view showing a radial cross section of the sealing member taken along line V31-V31 in FIG. 6.

Like the second embodiment described above, the inner tube portion 312a of the seal member 312 has a straight cylindrical shape that has the same diameter from one end to the other end in the insertion direction D31 into the tapered opening 122b. Further, like the second embodiment, the taper angle θ32 of the outer tube portion 312b is larger than the taper angle θ12 of the outer tube portion 112b in the first embodiment described above.

Here, in the present embodiment, the outer tube portion 312b is formed so that the front side in the insertion direction D31 is integrated with the inner tube portion 312a at a midway position in the insertion direction D31 of the inner tube portion 312a. For this reason, as shown in FIG. 7, the seal member 312 before being accommodated between the outer peripheral surface of the connector main body 111 and the inner peripheral surface of the tapered opening 122b has a substantially Y shape in which a bifurcated branch portion of the inner tube portion 312a and the outer tube portion 312b is inclined outward in the radial direction.

Needless to say, in the third embodiment described above, like the first embodiment described above, the seal member 312 as a waterproof structure is easy to design and manufacture, and the alignment with the through-hole 122 of the tapered opening 122b is also easy.

Moreover, the point which can improve the attachment property of the sealing member 312 with respect to the connector main body 111 by making the inner tube portion 312a into a straight cylinder shape in the present embodiment is the same as that of the second embodiment described above.

Next, a fourth embodiment will be described. In the fourth embodiment, the shape of the seal member is totally different from that of the first embodiment described above. Along with this, a difference from the first embodiment also occurs in the peripheral portion of the seal member.

Figure 8:
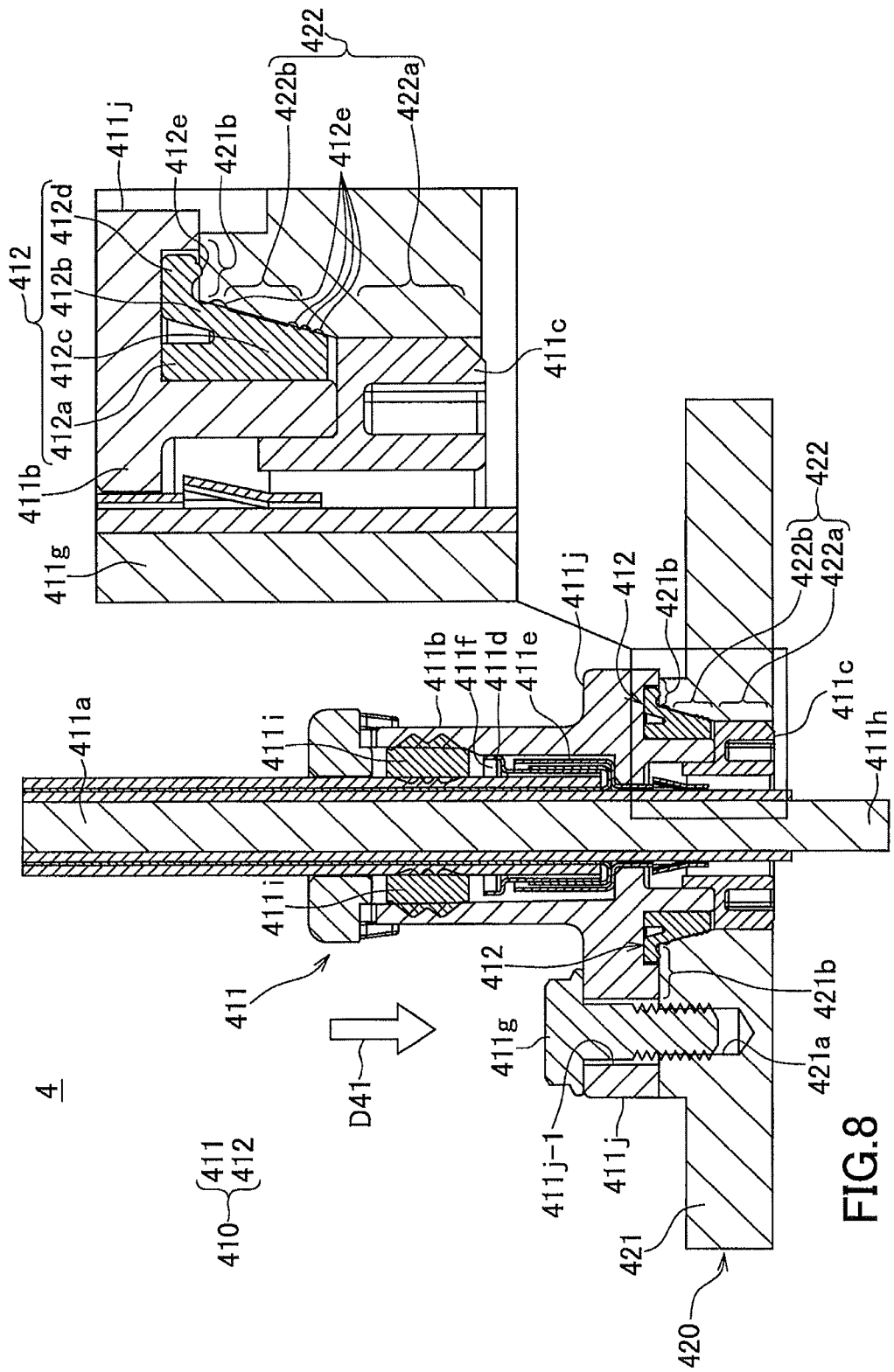
FIG. 8 is a schematic view showing a device with a connector according to a fourth embodiment of the present invention.

FIG. 8 is a schematic view showing a device with a connector according to a fourth embodiment of the present invention. In FIG. 8, similarly to FIG. 1 described above, the device with connector 4 is shown in a schematic cross-sectional view of the waterproof connector 410 and the outer wall 421 in the vicinity of the mounting position of the waterproof connector 410 in the device 420.

As the first embodiment, the device 420 is provided with a through-hole 422, in which the inside of the device is a cylindrical hole-shaped hole main body 422a and the outside of the device is a mortar-shaped tapered opening 422b, on the outer wall 421 as a location where the waterproof connector 410 is attached.

The waterproof connector 410 is partly inserted into the through-hole 422 of the device 420 in the insertion direction D41 in FIG. 8 and is waterproofed with respect to the through-hole 422. The waterproof connector 410 includes a connector main body 411 and a seal member 412.

Although the connector main body 411 has a slight difference in the illustrated shape, the basic structure is the same as that of the connector main body 111 of the first embodiment shown in FIG. 1. The connector main body 411 includes a terminal portion 411a, a housing 411b, a front holder 411c, a shield shell 411d, a sleeve 411e, a shield ring 411f, and a fixing bolt 411g.

The terminal portion 411a is a metal terminal that is coupled to the end of the shielded electric wire 411h and protrudes toward the outside of the device.

Both the housing 411b and the front holder 411c are made of resin and are formed in a substantially cylindrical shape. The housing 411b holds the terminal portion 411a together with the shielded electric wire 411h via a cylindrical internal seal member 411i made of a flexible resin such as rubber. The shield electric wire 411h extends through the front holder 411c into the device.

The connector main body 411 is provided with a flange portion 411j protruding from the outer peripheral surface of the housing 411b so as to face the peripheral surface 421b of the tapered opening 422b on the outer surface of the outer wall 421 of the device 420.

The shield shell 411d is a metal cylinder member, and covers a joint portion between the terminal portion 411a and the shielded electric wire 411g with a shield ring 411f interposed between the terminal portion 411a and the shield shell 411d.

The sleeve 411e is also a metal cylinder member, and covers the joint portion between the terminal portion 411a and the shielded electric wire 411g from the outer peripheral surface side of the shield shell 411d. The sleeve 411e and the shield shell 411d are caulked at the joint portion between the terminal portion 411a and the shielded electric wire 411g.

The fixing bolt 411g passes through the through-hole 411j-1 of the flange portion 411j and is screwed into the screw hole 421a of the outer wall 421. Thereby, the connector main body 411 is fastened and fixed to the outer wall 421 of the device 420.

The connector main body 411 described above is attached by being inserted into the through hole 422 provided in the outer wall 421 of the device 420 along the insertion direction D41 so that the end of the front holder 411c slightly protrudes inside the device. The waterproofing between the connector main body 411 and the through-hole 422 is achieved by the seal member 412.

Figure 9:
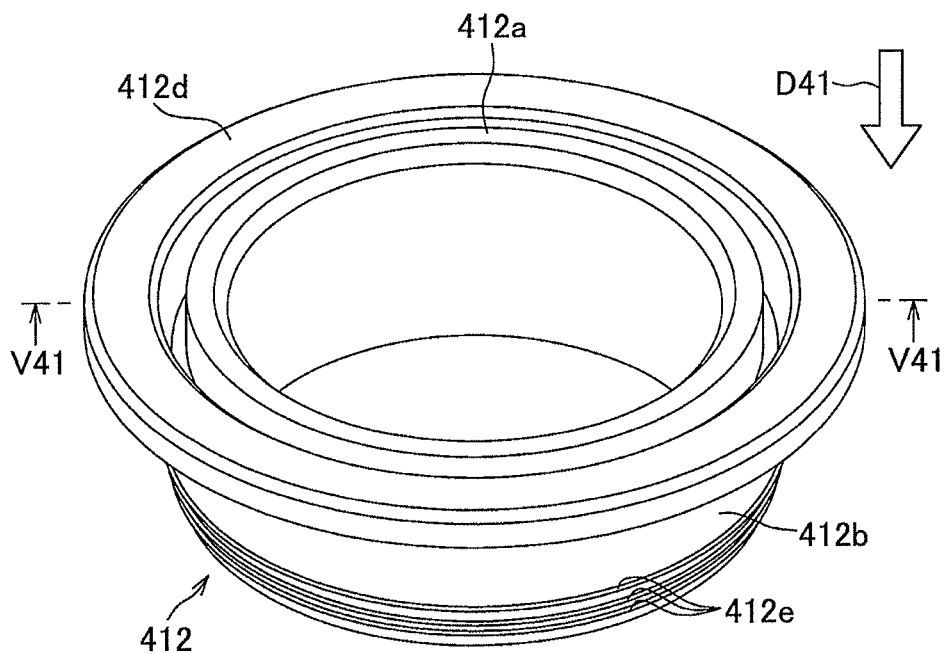
FIG. 9 is an external perspective view of a seal member shown in FIG. 8.
Figure 10:
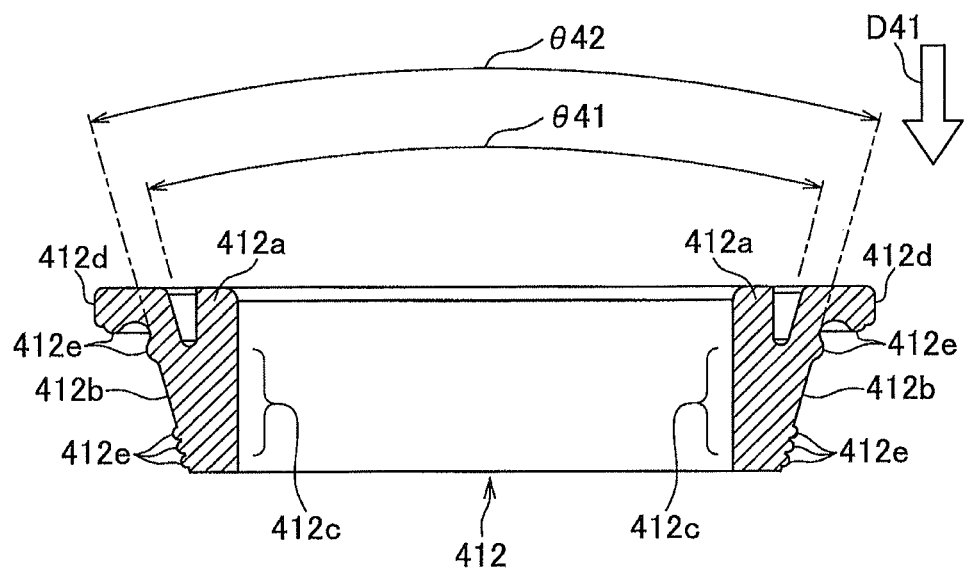
FIG. 10 is a cross-sectional view showing a radial cross section of the sealing member taken along line V41-V41 in FIG. 9.

FIG. 9 is an external perspective view of a seal member shown in FIG. 8, and FIG. 10 is a cross-sectional view showing a radial cross section of the sealing member taken along line V41-V41 in FIG. 9.

As shown in FIG. 8, the seal member 412 is a member that seals between the outer peripheral surface of the connector main body 411 and the inner peripheral surface of the tapered opening 422b. This seal member 412 is formed of a flexible oil-impregnated silicone rubber in a ring shape.

As shown in FIGS. 8 to 10, the seal member 412 in the present embodiment also has a double cylinder structure having an inner tube portion 412a and an outer tube portion 412b.

The inner tube portion 412a is a straight cylindrical portion that is face-to-face attached to the outer peripheral surface of the connector main body 411. The outer tube portion 412b surrounds the inner tube portion 412a in the circumferential direction on the rear side in the insertion direction D41 with respect to the tapered opening 422b, opens larger in diameter than the inner tube portion 412a, and shrinks in diameter in the insertion direction D41 so as to be integrated with the inner tube portion 412a. The outer tube portion 412b has a tapered cylindrical shape extending while being reduced in diameter in the insertion direction D41 at a taper angle θ42 larger than the taper angle θ41 of the tapered opening 422b.

Here, in the present embodiment, a thick portion 412c of the seal member 412 in which the inner tube portion 412a and the outer tube portion 412b are integrated with each other is longer in the insertion direction D41 than a portion other in which the inner tube portion 412a and the outer tube portion 412b are separated. The front side of the housing 411b in the connector main body 411 in the insertion direction D41 is formed to be narrow so that a space for accommodating the thick portion 412c is formed between the outer peripheral surface of the housing 411b and the inner peripheral surface of the tapered opening 422b. Accordingly, the front side of the front holder 411c in the insertion direction D41 protrudes from the housing 411b and contacts the inner peripheral surface of the hole main body 422a of the through-hole 422. The thick portion 412c of the seal member 412 is disposed so as to fill a space defined by the front outer peripheral surface of the connector main body 411, the inner peripheral surface of the tapered opening 422b, and the protruding portion of the front holder 411c. As shown in FIG. 10, the seal member 412 has a substantially Y-shape in which the inner tube portion 412a and the outer tube portion 412b have a thick vertical portion as a thick portion 412c in the radial cross section.

When the seal member 412 is housed in this manner, the outer tube portion 412b including the thick portion 412c is face-to-face attached to the inner peripheral surface of the tapered opening 422b while being pressed toward the inner tube portion 412a. Thereby, the space between the outer peripheral surface of the connector main body 411 and the inner peripheral surface of the tapered opening 422b is sealed.

Here, the seal member 412 of the present embodiment is provided with the following surface seal portion 412d. The surface seal portion 412d is a portion that extends from the opening of the outer tube portion 412b so as to overlap the peripheral surface 421b of the tapered opening 422b. The surface seal portion 412d is sandwiched between the flange portion 411j of the connector main body 411 and the peripheral surface 421b of the tapered opening 422b, and seals therebetween.

Further, the seal member 412 is provided with the following lip ring 412e. The lip ring 412e protrudes over the entire circumference from the surface facing the inner peripheral surface of the tapered opening 422b in the outer tube portion 412b, and is crushed and closely contacts the inner peripheral surface of the tapered opening 422b when the facing surface is face-to-face attached to the inner peripheral surface of the tapered opening 422b. In the present embodiment, such lip rings 412e are provided in one row closer to the device outer side and three rows closer to the device inner side of the facing surface of the outer cylinder portion 412b. Furthermore, the lip ring 412e is also provided in a row on the surface of the surface seal portion 412d facing the peripheral surface 421b of the tapered opening 422b.

Needless to say, in the fourth embodiment described above, like the first embodiment described above, the seal member 412 as a waterproof structure is easy to design and manufacture, and the alignment with the through-hole 422 of the tapered opening 422b is also easy.

Further, in the present embodiment, the thick portion 412c in which the inner tube portion 412a and the outer tube portion 412b are integrated in the seal member 412 is received in a space between the outer peripheral surface of the connector main body 411 and the inner peripheral surface of the tapered opening 422b. Thereby, since the contact pressure of the sealing member 412 with respect to the outer peripheral surface of the connector main body 411 and the inner peripheral surface of the tapered opening 422b is increased, a higher waterproof effect can be acquired.

Further, according to the present embodiment, since the surface seal portion 412d is sandwiched between the flange portion 411j of the connector main body 411 and the peripheral surface 421b of the through-hole 422, the water permeation into the through-hole 422 is suppressed, and a further higher waterproof effect can be acquired.

Moreover, according to the present embodiment, the waterproof effect with respect to the internal peripheral surface of the taper opening 422b can further be improved by providing the lip ring 412e in the surface facing the internal peripheral surface of the taper opening 422b in the seal member 412. Furthermore, by providing the lip ring 412e also on the surface of the face seal portion 412d that faces the peripheral surface 421b of the tapered opening 422b, the waterproof effect on the water permeation into the through-hole 422 can be further improved.

Next, a fifth embodiment will be described. The fifth embodiment is a modification of the above-described fourth embodiment. In the fifth embodiment, the shape of the seal member is different from that of the fourth embodiment. Accordingly, the front holder in the connector main body is also different from that of the fourth embodiment. Hereinafter, the fifth embodiment will be described by paying attention to differences from the fourth embodiment.

Figure 11:
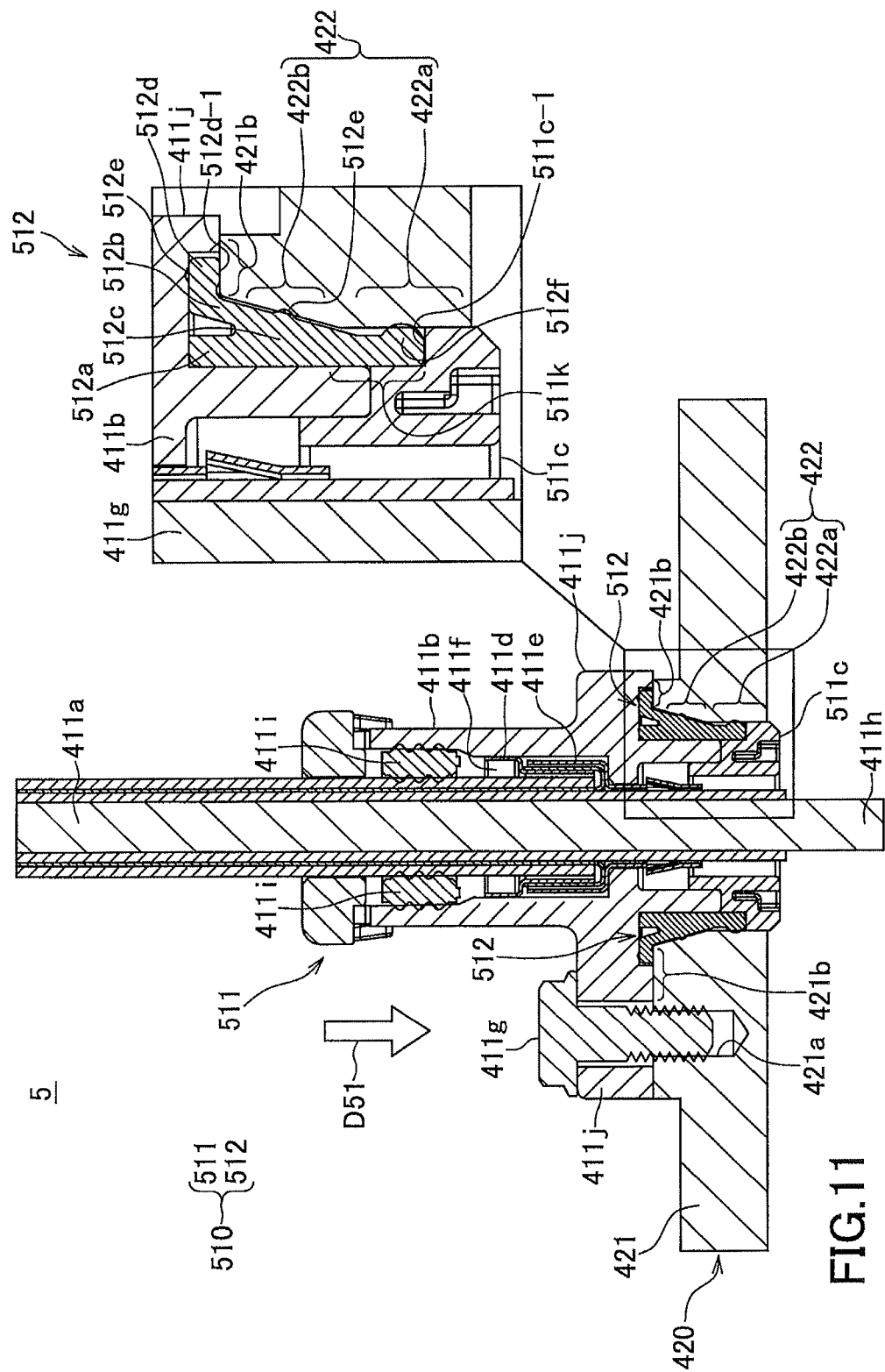
FIG. 11 is a schematic view showing a device with a connector according to a fifth embodiment of the present invention.
Figure 12:
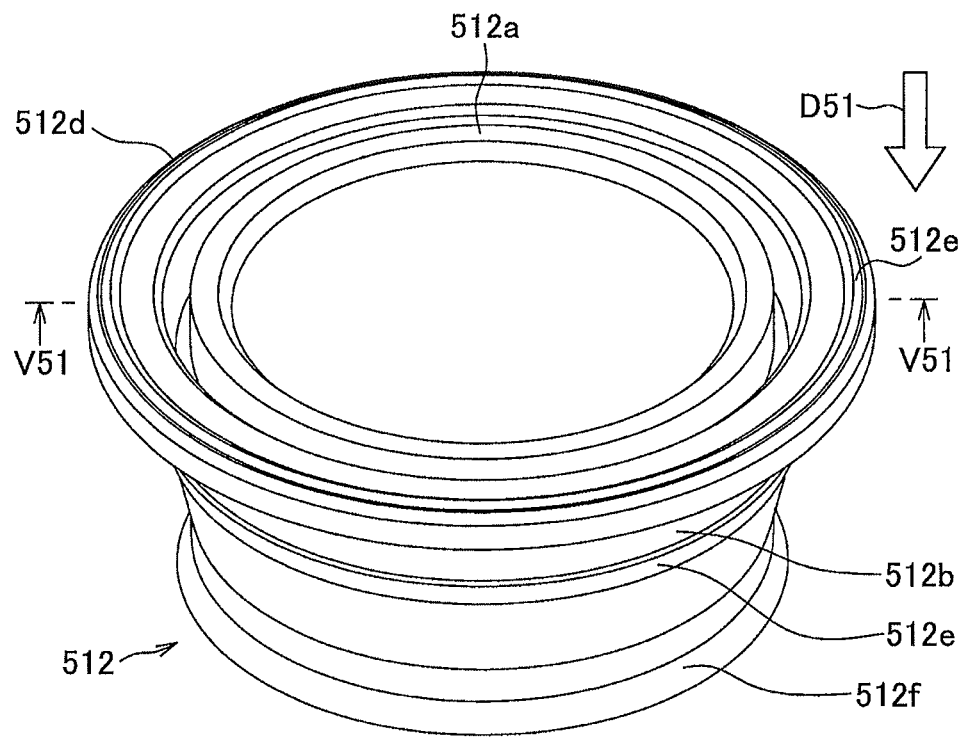
FIG. 12 is an external perspective view of a seal member shown in FIG. 11.
Figure 13:
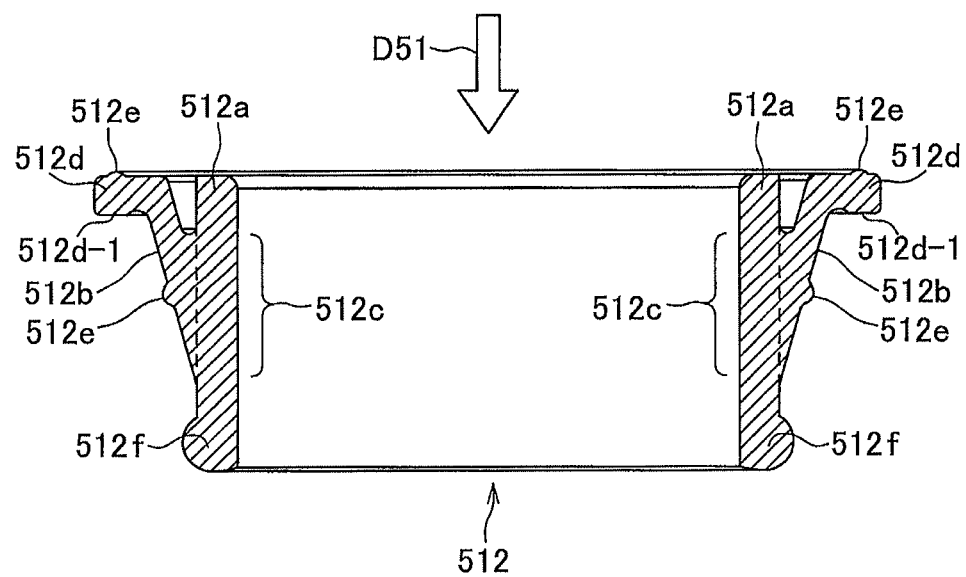
FIG. 13 is a cross-sectional view showing a radial cross section of the sealing member taken along line V51-V51 in FIG. 12.

FIG. 11 is a schematic view showing a device with a connector according to a fifth embodiment of the present invention. Further, FIG. 12 is an external perspective view of a seal member shown in FIG. 11, and FIG. 13 is a cross-sectional view showing a radial cross section of the sealing member taken along line V51-V51 in FIG. 12. Incidentally, in FIG. 11, the same components as those of the fourth embodiment shown in FIG. 8 are indicated by the same reference numerals as those in FIG. 8. In the following, duplicate explanations are omitted for those equivalent components.

In the device with connector 5 of the present embodiment, like the fourth embodiment above, the seal member 512 of the waterproof connector 510 includes a straight cylindrical inner tube portion 512a, a tapered cylindrical outer tube portion 512b, and a thick portion 512c in which both the inner and outer tube portions are integrated with each other. The inner tube portion 512a is face-to-face attached to the outer peripheral surface of the connector main body 511 (in the housing 411b) of the waterproof connector 510, and the outer tube portion 512b is face-to-face attached to the inner peripheral surface of the tapered opening 422b of the through-hole 422 provided in the outer wall 421 of the device 420. These face-to-face attachments are performed such that the thick portion 512c is accommodated between the outer peripheral surface of the connector main body 511 and the inner peripheral surface of the tapered opening 422b.

Further, a surface seal portion 512d extends from the opening of the outer tube portion 512b so as to overlap the peripheral surface 421b of the tapered opening 422b, and is sandwiched between the flange portion 411j of the connector main body 411 and the peripheral surface 421b of the tapered opening 422b to seal therebetween. Further, a portion of the surface seal portion 512d that faces the peripheral surface 421b of the tapered opening 422b is a protruding lip ring 512d-1 that protrudes toward the peripheral surface 421b over the entire circumference. Further, a lip ring 512e is provided for each row on the surface of the surface seal portion 512d facing the flange portion 411j and on the surface of the outer tube portion 512b facing the inner peripheral surface of the tapered opening 422b.

When the outer tube portion 512b of the seal member 512 is face-to-face attached to the inner peripheral surface of the tapered opening 422b, one row of lip rings 512e provided in the outer cylindrical portion 512b is crushed and closely contacts the inner peripheral surface of the tapered opening 422b. Further, when the surface seal portion 512d is sandwiched between the flange portion 411j and the peripheral surface 421b of the tapered opening 422b, the protruding lip ring 512d-1 is crushed and closely adhered to the peripheral surface 421b, and one row of lip rings 512e is crushed and closely adhered to the flange portion 411j. Thereby, the waterproof property by the sealing member 512 is improved.

Further, in the present embodiment, the inner tube portion 512a constituting the thick portion 512c extends in the insertion direction D51 from the thick portion 512c to the tapered opening 422b to constitute the following front seal portion 512f. The front seal portion 512f extends between the front outer peripheral surface 511k located on the front side in the insertion direction D51 in the connector main body 511 and the inner peripheral surface of the hole main body 422a of the through-hole 422 to seal therebetween. The inner peripheral surface of the hole main body 422a of the through-hole 422 is a front inner peripheral surface that is located on the front side in the insertion direction D51 with respect to the tapered opening 422b in the through-hole 422. On the other hand, the front outer peripheral surface 511k of the connector main body 511 is a surface portion extending from the front side portion in the insertion direction D51 with respect to the tapered opening 422b on the outer peripheral surface of the housing 411b to a part of the outer peripheral surface of the front holder 511c on the further front side. In order to provide a space for receiving the front seal portion 512f of the seal member 512 between the front holder 511c and the inner peripheral surface of the hole main body 422a, the front holder 511c is formed with a receiving step portion 511c-1 in which a part on the housing 411b side is separated from the inner peripheral surface of the hole body portion 422a. As shown in FIG. 13, the seal member 512 of the present embodiment has a substantially Y-shape in which the inner tube portion 512a and the outer tube portion 512b have a thick vertical portion as a thick portion 512c and the front seal portion 512f in the radial cross section.

The front-side seal portion 512f is face-to-face attached to the surface portion extending from a front side portion on the outer peripheral surface of the housing 411b to the receiving step portion 511c-1 on the outer peripheral surface of the front holder 511c. Furthermore, the inner peripheral surface side of the hole main body 422a in the front seal portion 512f is a protruding lip ring that protrudes to this inner peripheral surface over the entire periphery. The protruding lip ring is crushed so that the inner peripheral surface side of the hole main body portion 422a in the front seal portion 512f closely contacts the inner peripheral surface of the hole main body portion 422a. In the present embodiment, the waterproof property by the seal member 512 is also improved by the front seal portion 512f.

Needless to say, in the fifth embodiment described above, like the fourth embodiment described above, namely, like the first embodiment, the seal member 512 as a waterproof structure is easy to design and manufacture, and the alignment with the through-hole 422 of the tapered opening 422b is also easy.

In the present embodiment also, a higher waterproof effect can be acquired by the thick portion 512c, the surface seal portion 512d, and the lip ring 512e of the outer tube portion 512b in the seal member 512, like the fourth embodiment described above. Furthermore, in the present embodiment, the protruding lip ring 512d-1 and the lip ring 512e provided in the surface seal portion 512d also contribute to the improvement of the waterproof effect.

Further, according to the present embodiment, waterproofing between the connector main body 511 and the portion on the back side of the through-hole 422 with respect to the tapered opening 422b is performed by the front seal portion 512f provided in the seal member 512. In this way, according to the present embodiment, the waterproofness between the connector main body 511 and through-hole 422 extending from the tapered opening 422b to the portion on the back side can be covered by the single seal member 512, so that the number of components can be reduced.

Incidentally, the first to fifth embodiments described above are merely representative forms of the present invention, and the present invention is not limited to these embodiments. That is, various modifications can be made without departing from the scope of the present invention. Of course, such modifications are included in the scope of the present invention as long as the waterproof connector and the device with the connector of the present invention are provided.

For example, in the first to fifth embodiments described above, particularly in the first, fourth, and fifth embodiments, as an example of the connector main body according to the present invention, the connector bodies 111, 411, and 511 illustrating the internal structure are provided. However, the connector main body referred to in the present invention does not ask the specific internal structure as long as it is attached by being partially inserted into the through-hole provided with the tapered opening.

Further, in the first to fifth embodiments described above, as an example of the seal member according to the present invention, the seal members 112 and 212 in which the inner tube portion and the outer tube portion form a substantially V shape and the seal members 312, 412, and 512 that form a substantially Y shape in the radial cross section are illustrated. However, the specific shape of the sealing member in the present invention in the radial cross section can be arbitrarily set as long as it has an inner tube portion and an outer tube portion that form a double cylinder structure separated on the rear side in the insertion direction to the taper opening and integrated on the front side.

REFERENCE SIGNS LIST 1, 4, 5 device with connector
110, 410, 510 waterproof connector
111, 411, 511 connector main body
111a, 411a terminal portion
111b, 411b housing
111c, 411c, 511c front holder
111c-1, 511k front outer peripheral surface
111d, 411d shield shell
111e, 411e sleeve
111f, 411g fixing bolt
111g, 411h shielded wire
111h, 411j flange portion
111h-1, 411j-1 through-hole
111i first inner seal member
111j second inner seal member
111k third inner seal member
112, 212, 312, 412, 512 seal member
112a, 212a, 312a, 412a, 512a inner tube portion
112b, 212b, 312b, 412b, 512b outer tube portion
113 second seal member
120, 420 device
121, 421 outer wall
121a, 421a screw hole
121b, 421b surrounding surface
122, 422 through-hole
122a, 422a hole main body
122b, 422b tapered opening
411f shield ring
411i inner seal member
412c, 512c thick portion
412d, 512d surface seal portion
412e, 512e lip ring
511c-1 receiving step portion
512d-1 protruding lip ring
512f front seal portion
D11, D21, D31, D41, D51 insertion direction
θ11, θ12, θ22, θ32, θ41, θ42, taper angle

The invention claimed is:

1. A waterproof connector comprising:
a connector main body attached to a device such that a part of the connector main body is inserted into a through-hole that penetrates an outer wall of the device, and an opening on an outside of the device has a larger diameter than an inside of the device and becomes a tapered opening that is reduced in diameter toward the inside of the device; and
a ring-shaped and flexible seal member that seals between an outer peripheral surface of the connector main body and an inner peripheral surface of the tapered opening to waterproof the through-hole,
wherein the seal member includes:
a cylindrical inner tube portion that is face-to-face attached to the outer peripheral surface of the connector main body; and
an outer tube portion that surrounds the cylindrical inner tube portion in a circumferential direction at a rear side of an insertion direction into the tapered opening, opens in a larger diameter than the cylindrical inner tube portion, and is integrated with the cylindrical inner tube portion at a front side in the insertion direction, and when the seal member is received between the outer peripheral surface of the connector main body and an inner peripheral surface of the tapered opening, face-to-face attached to the inner peripheral surface of the tapered opening while being pressed toward the cylindrical inner tube portion.

2. The waterproof connector as claimed in claim 1, wherein the connector main body includes a flange portion projecting from the outer peripheral surface of the connector main body so as to face a peripheral surface of the tapered opening on an outer surface of the outer wall.

3. The waterproof connector as claimed in claim 1, wherein the outer tube portion has a tapered cylindrical shape extending while being reduced in diameter in the insertion direction with a taper angle larger than a taper angle of the tapered opening.

4. The waterproof connector as claimed in claim 1, wherein the cylindrical inner tube portion has a reverse tapered cylindrical shape whose diameter is reduced in a direction opposite to the insertion direction.

5. The waterproof connector as claimed in claim 1,
wherein the cylindrical inner tube portion has a straight cylindrical shape that is substantially the same diameter from one end to the other end in the insertion direction.

6. The waterproof connector as claimed in claim 1,
wherein the connector main body includes a flange portion projecting from the outer peripheral surface of the connector main body so as to face a peripheral surface of the tapered opening on an outer surface of the outer wall, and
wherein the seal member includes a surface seal portion that extends from an opening of the outer tube portion so as to overlap the peripheral surface and is sandwiched between the flange portion and the peripheral surface to seal therebetween.

7. The waterproof connector as claimed in claim 1,
wherein the cylindrical inner tube portion includes a front seal portion that extends between a front outer peripheral surface of the connector main body located on a front side of the tapered opening in the insertion direction and a front inner peripheral surface of the through-hole located on a front side of the tapered opening in the insertion direction, and seals therebetween.

8. The waterproof connector as claimed in claim 1,
wherein the seal member is provided with a lip ring that projects over the entire circumference from a facing surface of the outer tube portion facing the inner peripheral surface of the tapered opening, and is crushed to closely contact the inner peripheral surface of the tapered opening when the facing surface is face-to-face attached to the inner peripheral surface of the tapered opening.

9. A device with a connector comprising:
the device provided with a through-hole penetrating an outer wall of the device, and in which an opening portion on an outside of the outer wall has a larger diameter than an opening portion on an inside of the outer wall and becomes a tapered opening that is reduced in diameter toward the inside; and
a waterproof connector as claimed in claim 1, a part of which is inserted into and attached to the through-hole to waterproof the through-hole.

* * * * *